(12) United States Patent
Takashina et al.

(10) Patent No.: US 6,409,257 B1
(45) Date of Patent: Jun. 25, 2002

(54) VEHICLE SIDE SILL STRUCTURE

(75) Inventors: Katsuhiko Takashina, Okazaki; Hiroyuki Nagura, Anjo; Hiroyuki Kurokawa, Nisshin, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,707

(22) Filed: Oct. 11, 2001

(30) Foreign Application Priority Data

Oct. 11, 2000 (JP) ........................................ 2000-310880

(51) Int. Cl.$^7$ .............................................. B62D 27/02
(52) U.S. Cl. .................. 296/209; 296/203.03; 296/188; 296/30
(58) Field of Search .......................... 296/209, 203.03, 296/188, 189, 30

(56) References Cited

U.S. PATENT DOCUMENTS 4,440,434 A * 4/1984 Celli ...................... 296/209 X 6,193,306 B1 * 2/2001 Lee ............................ 296/209

FOREIGN PATENT DOCUMENTS

| JP | 64-18784 A | 1/1989 |
| JP | 6-99851 A | 4/1994 |

* cited by examiner

*Primary Examiner*—Joseph D. Pape

(57) ABSTRACT

In a vehicle side sill structure in which a side sill portion having a substantially closed cross section extending in a longitudinal direction of a vehicle body is provided at the side of the vehicle body, a pipe member is disposed inside the side sill portion in such a manner as to extend in the longitudinal direction of the vehicle body, and at least two concave portions (fragile portions) are formed in a side portion of the pipe member. Further, a reinforcing member is disposed substantially along the side portion of the pipe member, and cooperates with the side portion to form a second closed section. This enables proper deformation particularly during side impact with a simple structure.

6 Claims, 4 Drawing Sheets

VEHICLE SIDE SILL STRUCTURE

BACKGROUND OF THE INVENTION

This nonprovisional application incorporates by reference the subject matter of Appl. No. 2000-310880 filed in Japan on Oct. 11, 2000, on which a priority claim is based under 35 U.S.C. § 119(a).

1. Field of the Invention

This invention generally relates to a vehicle side sill structure, and more particularly to a vehicle side sill structure capable of properly deforming in response to vehicle frontal impact, offset impact, and side impact.

2. Description of Related Art

A frame portion of the vehicle is basically formed to have a predetermined rigidity since it receives various kinds of impacts from the outside while running. In particular, the frame portion of the vehicle comprises a portion that allows deformation for absorbing impacts when receiving an overload, and a portion that improves rigidity with a high priority to ensure a passenger space such as a frame portion around a vehicle compartment.

Incidentally, a vehicle body frame portion, forming the side portion of the vehicle body, is comprised of a roof rail disposed in the lower section of the vehicle body; a side sill disposed in the lower section of the vehicle body; a front pillar, a center pillar, and a rear pillar that connect the roof rail and the side sill; and so forth. Each of these members is usually formed to have a closed section to improve the rigidity thereof. Among these members, the side sill in particular receives an overload (compressive load) in the longitudinal direction in a frontal impact or an offset impact, and it is therefore necessary to inhibit the side sill itself from curving and buckling to disperse the load. Further, when the side sill receives an overload along the width of the vehicle in a side impact, it is preferable to control the mode of bending along the width of the vehicle (the mode of bending of the side sill itself).

However, in a conventional side sill structure disclosed in, for example, Japanese Patent Laid-Open Publication No. 6-99851, an inverted T-shaped pipe member is disposed in an inverted T-shaped space to improve the rigidity in an-inverted T shaped connecting portion between a side sill and a center pillar joined to the intermediate section of the side sill and to inhibit the deformation of the connecting portion in a side impact. In another conventional side sill structure disclosed in Japanese Patent Laid-Open Publication No. 64-18784, a pipe member is disposed in a closed space, which is continuously formed along the longitudinal side of a side sill, through a plurality of bulkheads in order to disperse a load when a vehicle receives an overload (compressive load) along the longitudinal side of the side sill.

Therefore, the above-mentioned conventional structure does not enable proper deformation particularly in a side impact although various measures are taken to improve the rigidity.

SUMMARY OF THE INVENTION

It is therefore an object of the present invention to provide a vehicle side sill structure capable of deforming particularly in a side impact.

The above object can be accomplished by providing a vehicle side sill structure, in which a side sill portion having a substantially closed section extending in a longitudinal direction of a vehicle body, is provided at a side of the vehicle body, the vehicle side sill structure comprising: a center pillar joined to an intermediate section of the side sill portion and extended upward; a pipe member disposed inside the side sill portion and extended in the longitudinal direction of the vehicle body, at least two fragile portions formed in a side portion of the pipe member across the intermediate section; and a reinforcing member disposed substantially along the side portion of the pipe member to cover the fragile portions, and cooperating with the side portion to form a second closed section.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will now be described with reference to the accompanying drawings.

Figure 1:
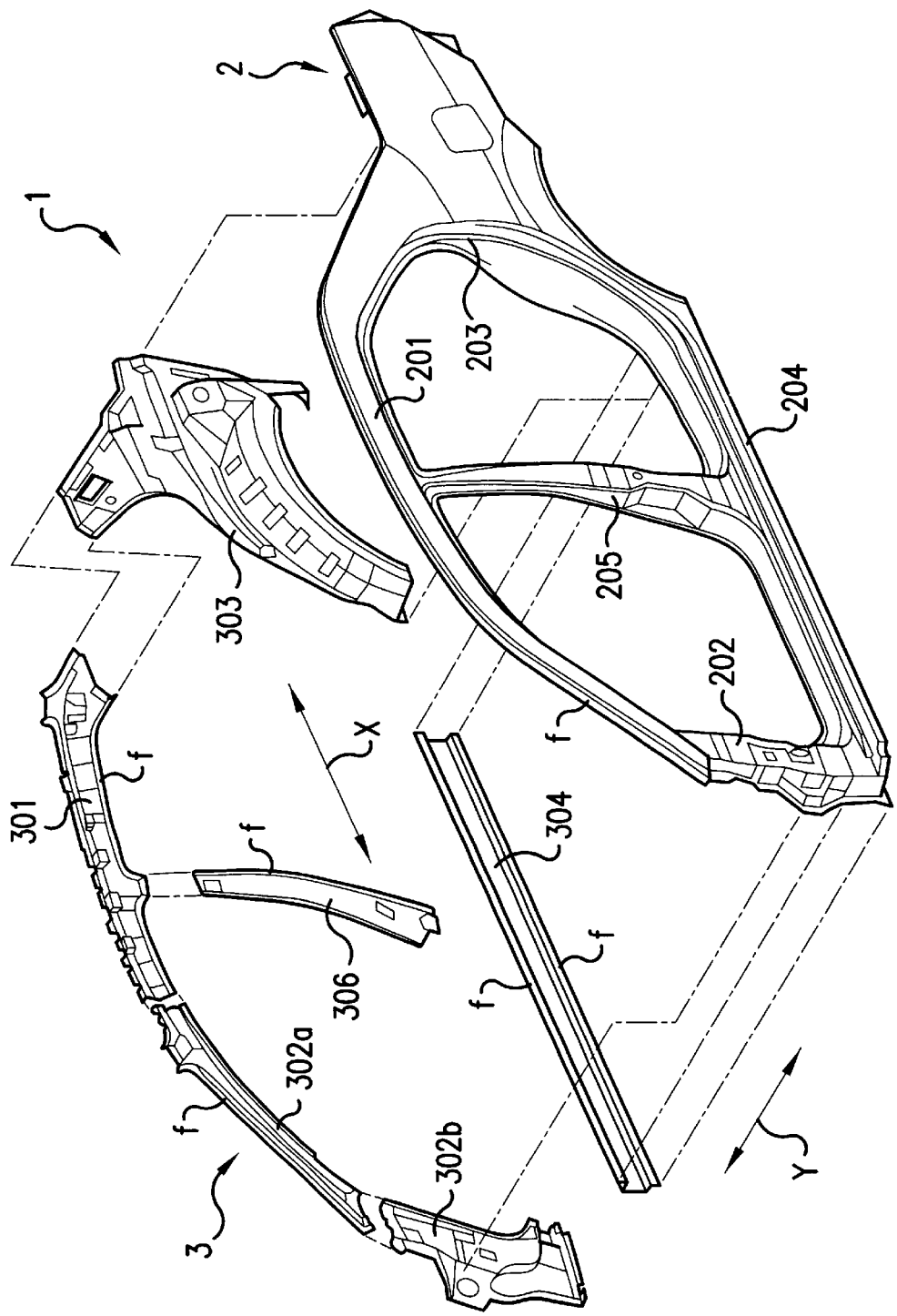
FIG. 1 is an exploded perspective view showing a vehicle body side frame structure to which a vehicle side sill structure according to an embodiment of the present invention is applied.
Figure 2:
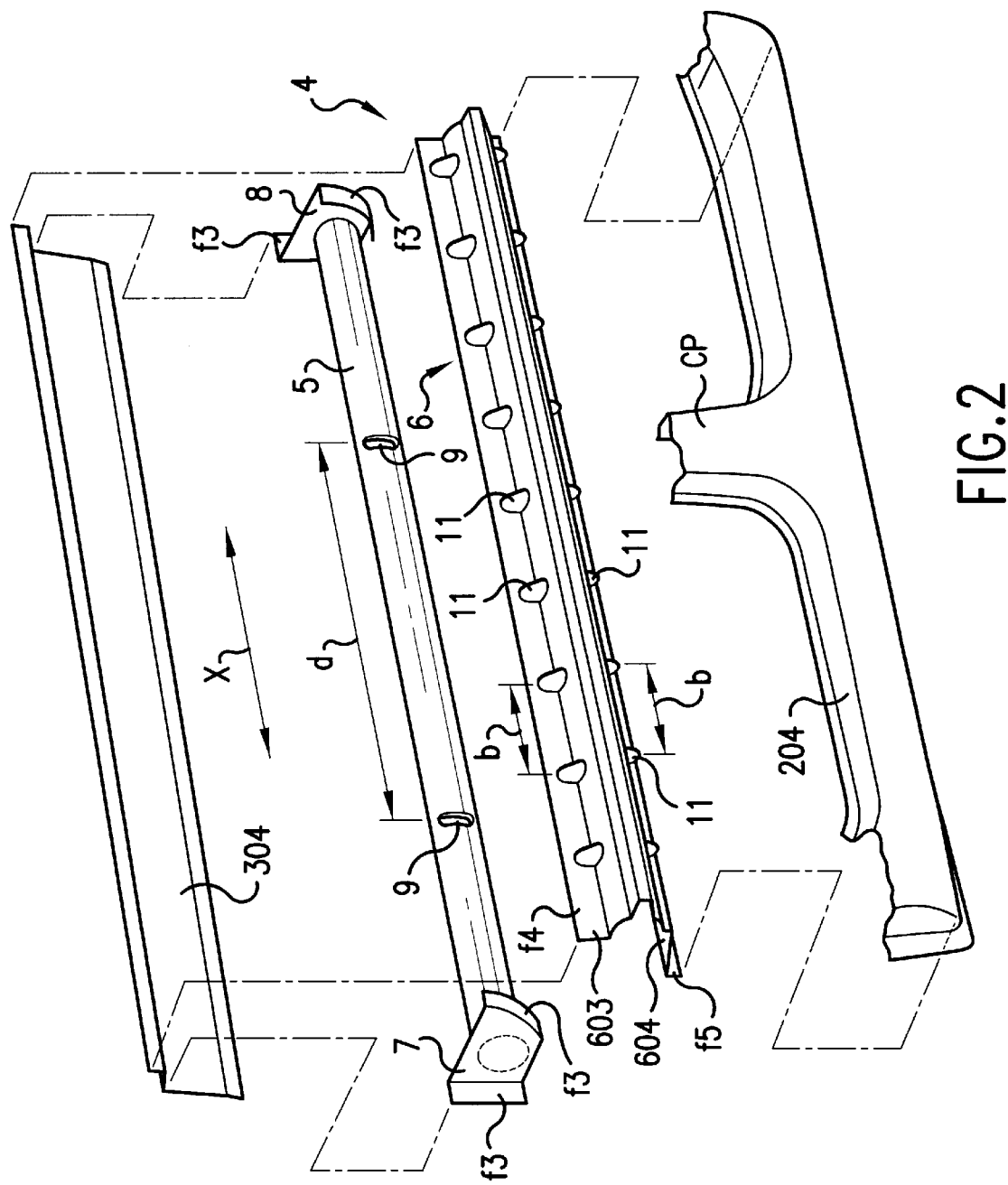
FIG. 2 is an exploded perspective view showing a side sill portion in the vehicle body side frame structure.

FIGS. 1 and 2 illustrate a vehicle body side frame structure 1 to which a side sill structure for a vehicle according to an embodiment of the present invention.

In the vehicle body side frame structure 1, a single side outer panel 2 that extends continuously over portions facing a vehicle compartment and a trunk, not shown, and a side inner panel composed of multiple members are integrated together by welding or the like. Although FIG. 1 only shows the vehicle body side frame structure 1 at the left side, the vehicle body side frame structure 1 is combined with a vehicle body right side frame structure (not shown) dissymmetric with the vehicle body left side frame structure, and a number of frame components (not shown) disposed in a portion facing the vehicle compartment, a portion facing the trunk, a portion facing an engine room, etc. to thus construct the whole frame structure of a vehicle body.

An upper lateral portion 201 of the side outer panel 2 and a side roof rail inner 301 form a side roof rail (not shown) having a closed section extending in a longitudinal direction X of the vehicle body. A front longitudinal pillar 202 of the side outer panel 2 and vertical front pillar inners 302a, 302b form a front pillar (not shown) having a substantially closed section extending in the vertical direction of the vehicle body. Further, a rear longitudinal pillar 203 of the side outer panel 2 and a rear quarter panel 303 form a rear pillar (not shown) having a substantially closed section extending in the vertical direction. A side sill SS (see FIG. 3), having a closed cross section and extending in the longitudinal direction X of the vehicle body, is comprised of a lower lateral portion (hereinafter referred to as "side sill outer 204") of the side outer panel 2 and a side sill inner 304. A center pillar (see FIG. 4) CP, joined to the intermediate section of the side sill SS and extended upward, is comprised of a center pillar portion 205 of the side outer panel 2 and a center pillar inner 306.

It should be noted that each of the above-mentioned members is formed by pressing a steel plate, and that a plurality of flanges f, extending from corresponding positions in the peripheries of the respective members and overlapping portions with various shapes, are welded together to form the side frame structure 1.

Figure 3:
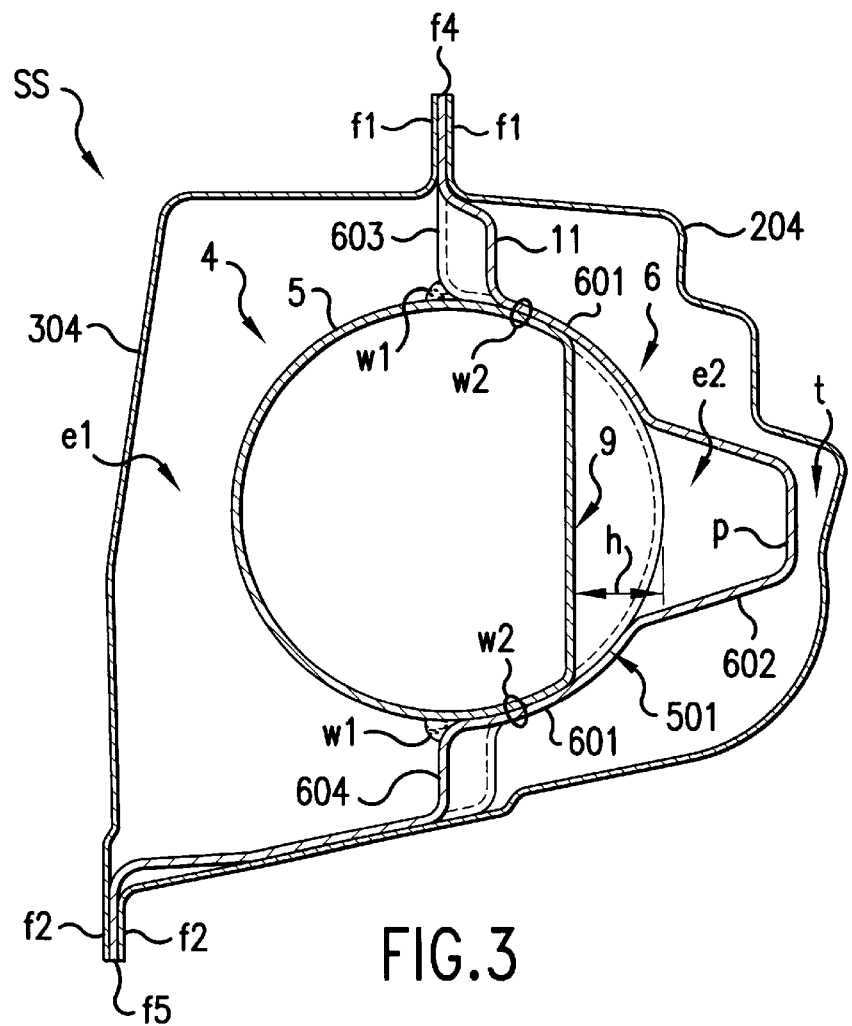
FIG. 3 is an enlarged sectional view showing a side sill in FIG. 1.

As shown in FIGS. 2 and 3, the side sill SS forms a first closed space e1 extending in the longitudinal direction X of the vehicle body (a direction vertical to paper of FIG. 3) by joining the side sill outer 204 as the lower lateral portion of the side outer panel 2 and the upper and lower flanges f1, f2 of the side sill inner 304. Further, in the first closed space e1, formed by integrating the side sill outer 204 and the side sill inner 304 in such a manner as to form a first closed section, a reinforcing frame 4 is disposed across the whole area in the longitudinal direction X of the side sill SS.

The reinforcing frame 4 is composed of a metallic pipe member 5 and a reinforcing member 6 disposed along an external side portion 501 of the pipe member 5 at the outer side with respect to the vehicle body (at the right side in FIG. 3).

A front bracket 7 and a rear bracket 8 are respectively joined to the front and rear ends of the pipe member 5. Principal portions of the front and rear brackets 7, 8 and multiple portions of end flanges f3 respectively overlap the front and rear ends of the side sill outer 204 and the side sill inner 304. The overlapping portions are integrated together. Since the front and rear brackets 7, 8 are attached to the front and rear ends of the pipe member 5, the pipe member 5 is prevented from protruding in the longitudinal direction X when receiving an overload applied in the longitudinal direction X. Incidentally, the front and rear brackets 7, 8 should be provided as the necessity arises in terms of an overload applied to the pipe member 5 in the longitudinal direction X.

At the center of the side portion 501 of the pipe member 5, two concave portions 9, as fragile portions, are formed at a predetermined interval d facing the outer side of the vehicle. Each concave portion 9 has a groove, having a thickness h, that is equivalent to about ⅙ of an inner diameter of the pipe member 5, so that the mode of bending from the concave portions 9 can be controlled. In the intermediate section between the two concave portions 9 in the pipe member 5, the bottom end of the center pillar CP is connected to the side sill SS in an inverted T-shape. This prevents the bottom end of the center pillar from curving and causes the two concave portions 9 to curve upon a side impact as described later. The predetermined interval d is varied according to the types of vehicles since the buckling positions must be controlled according to the basic dimensions of a vehicle such as the size of a vehicle, the position of passengers, and the energy diffusing conditions.

The reinforcing member 6 and the pipe member 5 have substantially the same length, and they are continuously welded at the side portion 501 of the pipe member 5 at a plurality of positions to overlap each other. The reinforcing member 6 is provided with a convex protruding portion 602 whose point p protrudes toward the outer side of the vehicle body from upper and lower welded portions 601 where the reinforcing member 6 overlaps the side portion 501 of the pipe member 5 such that a gap t is formed between the point p and the side sill outer 204. The smaller the gap t is, the strength of the side sill SS against the side impact is improved, but the gap t is preferably between 3 mm and 5 mm to prevent the reinforcing member and the side sill from interfering due to the variations in production. The reinforcing member 6 is further provided with upper and lower extending plate portions 603, 604 that extend in the vertical direction from the upper and lower ends of the upper and lower welded portions 601. The upper and lower extending plate portions 603, 604 are formed by pressing steel plates.

The upper extending plate portion 603 of the reinforcing member 6 is formed as a longitudinal plate. At the base end of the upper extending plate portion 603, a plurality of beads 11 extending in the vertical direction is formed at regular intervals b in the longitudinal direction X of the vehicle body. In the upper extending plate portion 603, a portion at the upper side of the upper ends of the beads 11 forms a flange f4. The upper extending plate portion 603 is integrated with the side sill outer 204 and the side sill inner 304 in the state of being sandwiched between the overlapping portions of the respective upper flanges f1 thereof.

The lower extending plate portion 604 of the reinforcing member 6 is formed as a curved plate. At the base end of the lower extending plate portion 604, a plurality of beads 11 extending in the vertical direction is formed at regular intervals b in the longitudinal direction X of the vehicle body. In the lower extending plate portion 604, a portion at the lower side of the lower ends of the beads 11 is buckled steplike, and a point thereof forms a flange f5 that is integrated with the side sill outer 204 and the side sill inner 304 in the state of being sandwiched between the overlapping portions of the respective lower flanges f2 thereof. The beads 11 are intended to improve flexural rigidity of the reinforcing member along the width of the vehicle to thus prevent the reinforcing member from being displaced along the width of the vehicle to come into contact with the side sill SS and make noise while the vehicle is running. The shorter the predetermined interval b is, the curving rigidity of the reinforcing member along the width of the vehicle is increased; however, a preferable interval b is between 50 mm and 80 mm in terms of welding pitches. In FIG. 3, reference W1 denotes points of arc welding; W2, points of indirect welding. The welding process is carried out at the respective points W1, W2.

In the reinforcing frame 4 in FIGS. 2 and 3, the reinforcing member 6 is continuously welded to the side portion 501 of the pipe member 5 at a portion facing the outer side of the vehicle body. Therefore, the cooperation of the pipe member 5 and the reinforcing member 6 forms a closed section that forms the second closed space e2, and this improves the rigidity of the reinforcing frame 4. In particular, the reinforcing member 6 covers the two concave portions 9 of the pipe member 5 in such a manner as to bridge the gap between them, and this maintains the rigidity of the covered portion against a compressive load at substantially the same level as the rigidity of other portions.

As stated above, the side sill SS forms the first closed section by the side sill outer 204 and the side sill inner 304 and forms the first closed space e1 extending in the longitudinal direction X of the vehicle body, thereby ensuring the basic rigidity. Further, the second closed space e2 is formed by integrating the pipe member 5 and the reinforcing member 6 forming the reinforcing frame 4 in the first closed space e1 in such a manner as to form the second closed section. Therefore, the side sill SS is capable of satisfactorily inhibiting the buckling deformation even if an excessive compressive load is applied.

Suppose that a vehicle manufactured by using the vehicle body side frame structure 1, wherein the reinforcing frame 4 is added to the frame of the side sill SS, receives a frontal impact or an offset impact while running. In this case, an overload in the longitudinal direction is applied to the front end of the side sill SS, but the pipe member 5 formed like a round pipe is capable of reinforcement against such an excessive compressive load. Moreover, the rigidity of the reinforcing frame 4, forming the second closed space e2 as well as the rigidity of the side sill outer 204 and the side sill inner 304 forming the first closed space e1, disperses the excessive compressive load through the side sill SS, i.e. disperses and transmits the excessive compressive load to the rear pillar disposed at the rear of the vehicle body.

Moreover, the reinforcing member 6 covers the two concave portions 9 of the pipe member 5 in such a manner as to bridge the gap between them, and thus, the rigidity of the covered portion against the buckling deformation is maintained at substantially the same level as the rigidity of other portions to thus prevent the covered portion from buckling quickly.

Although the above description was made with respect to the frontal impact, the same effects can be achieved in the case of a rear impact since the side sill SS is deformed in reverse in substantially the same manner.

On the other hand, suppose that the intermediate section of the side sill SS receives a side impact while the vehicle is running.

Figure 4:
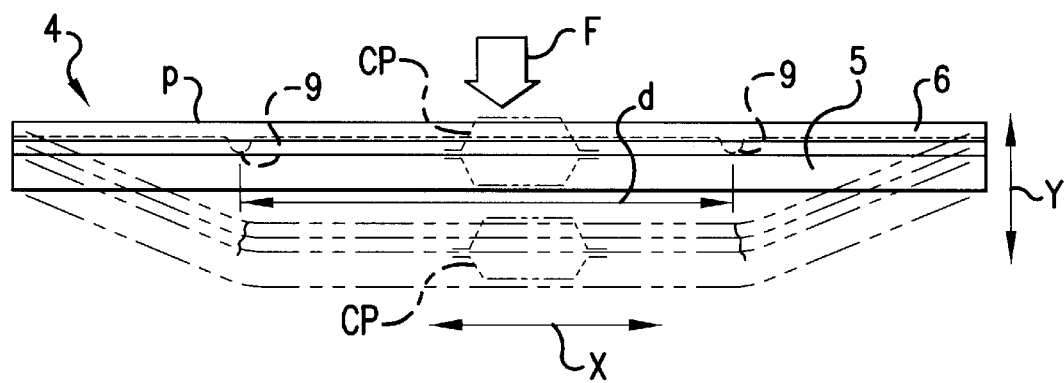
FIG. 4 is a view showing a modification of a reinforcing frame in the side sill in FIG. 1.

The bottom end of the center pillar CP is integrated with the intermediate section of the side sill SS in the inverted T-shape. As shown in FIG. 4, the two concave portions 9 are formed at a predetermined interval d in the pipe member 5.

Thus, when an overload F in the lateral direction Y of the vehicle is applied to the intermediate section of the side sill SS, the side sill outer 204 collapses by the gap t (see FIG. 3).

The reinforcing frame 4 then deforms relatively easily due to a load from the side compared with the compressive load. On this occasion, the pipe member 5 deforms at the two concave portions 9 toward the center of the vehicle body (downward in FIG. 4), and the side sill inner 304 also deforms.

Thus, if the protruding portion 602 of the reinforcing member 6 is attached to the outside of the vehicle (facing to the outside), energy can be efficiently transmitted to the reinforcing frame 4 having a high rigidity to exercise an energy absorbing function more quickly after the side impact.

Further, since the pipe member 5 is curved at the two concave portions and not at one point during the side impact, it is possible to significantly decrease the degree to which the intermediate section of the side sill SS and the center pillar CP enter the vehicle compartment (i.e. the amount of deformation) and significantly lower the speed at which the intermediate section of the side sill SS and the center pillar CP enter the vehicle compartment. In other words, a bending mode control function can be exercised to realize a desired deformation mode to thus improve safety of passengers.

Further, when the intermediate section of the side sill SS receives the side impact, the protruding portion 602 of the reinforcing member 6 and the pipe member 5 are able to sequentially absorb an overload caused by the side impact. This improves the impact absorbing function.

Further, in the side sill SS shown in FIG. 2, the first closed space e1, extending in the longitudinal direction X of the vehicle, is formed by the side sill outer 204 and the side sill inner 304, and the reinforcing frame 4 is disposed in the first closed space e1. Thus, the structure is simplified compared with the conventional structure. Accordingly, it is also possible to reduce the number of parts and the number of steps in welding and simplify dies and equipment, thus lowering the manufacturing cost. Moreover, it is possible to reduce the total weight by reducing the total plate thickness of the side sill outer 204 and the side sill inner 304 that form the external surface.

Figure 5:
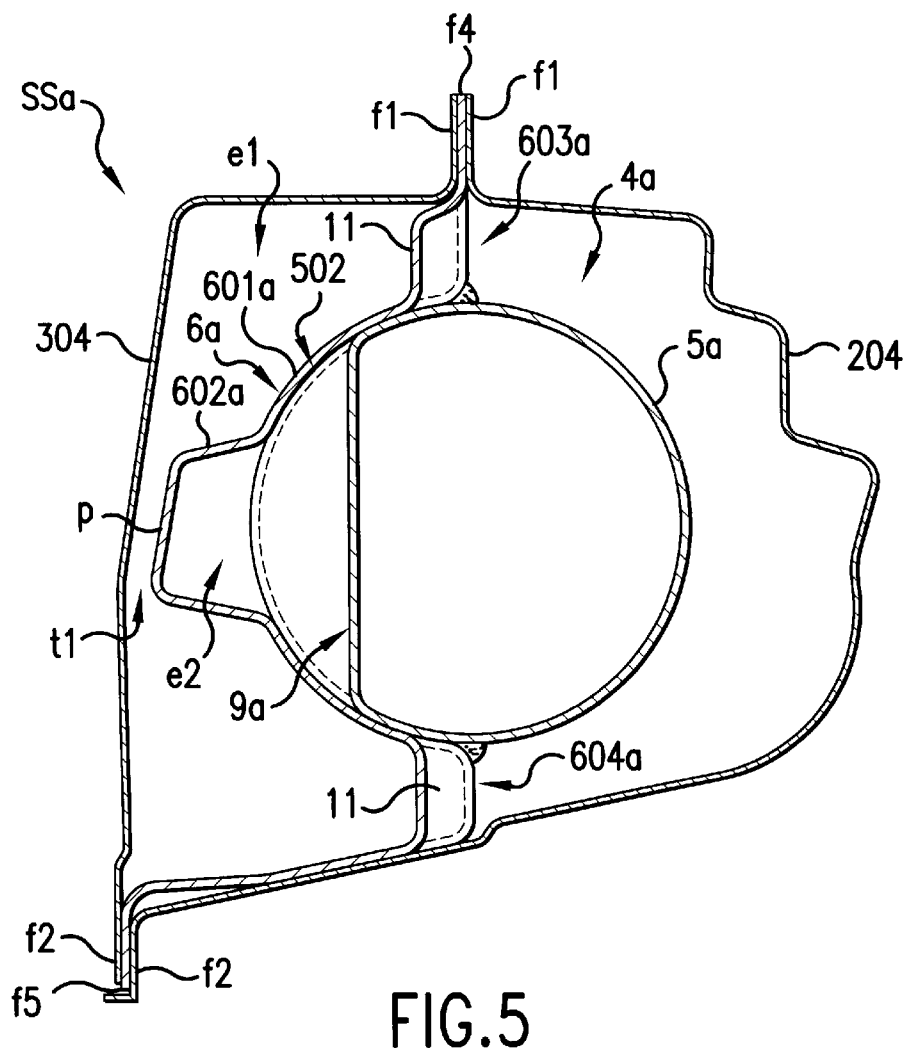
FIG. 5 is an enlarged sectional view showing another side sill used in place of the side sill in the vehicle body side frame structure.

FIG. 5 illustrates a side sill SSa in a vehicle body side frame structure 1a (not shown) to which a vehicle side sill structure according to the second embodiment is applied.

The structure of the side sill SSa is different from that of the side sill SS in the vehicle body side frame structure 1 in FIG. 2 only in that a pipe member 5a and a reinforcing member 6a forming a reinforcing frame 4a are laterally reversed in position (horizontal direction in FIG. 5), and a description thereof is therefore omitted here.

In the side sill SSa shown in FIG. 5, the side sill outer 204 and the side sill inner 304 form a first closed space e1, and the reinforcing frame 4a is disposed across the whole area of the first closed space e1 in the longitudinal direction X (i.e. a direction vertical to paper of FIG. 5).

The reinforcing member 4a is comprised of the pipe member 5a and the reinforcing member 6a disposed along a side portion 502 of the pipe member 5a at the inside of the vehicle body (at the left side in FIG. 5). The front and rear ends of the pipe member 5a are integrally welded to the front and rear ends of the side sill outer 204 and the side sill inner 304 via front and rear brackets, not shown. In the central section of the side portion 502 of the pipe member Sa, two concave portions 9a are formed at a predetermined interval d (see FIG. 6) facing the center of the vehicle compartment, so that the mode of bending from these concave portions 9a can be controlled.

The reinforcing member 6a is comprised of upper and lower welded portions 601a that are welded to the side portion 502 of the pipe member 5a at portions facing the inside of the vehicle body, a convex protruding portion 602a that protrudes toward the inside of the vehicle body such that a point p thereof faces the side sill inner 304 across a gap t1, and upper and lower extending plate portions 603a, 604a. A plurality of beads 11 is formed at the longitudinal plate-shaped base ends of the upper and lower extending plate portions 603a, 604a of the reinforcing member 6a. A portion at the upper side of the upper extending plate portion 603a forms a flange f4 and is integrally welded to respective upper flanges f1 of the side sill outer 204 and the side sill inner 304. At the base end of the lower extending plate portion 604a, a steplike curved portion extends from the bottom end of the bead 11. A flange f5 at the point of the curved portion is welded to respective lower flanges f2 of the side sill outer 204 and the side sill inner 304.

Suppose that a vehicle manufactured by using the vehicle body side frame structure la, wherein the reinforcing frame 4a is added to the frame of the side sill SSa, receives a frontal impact or an offset impact while running.

Figure 6:
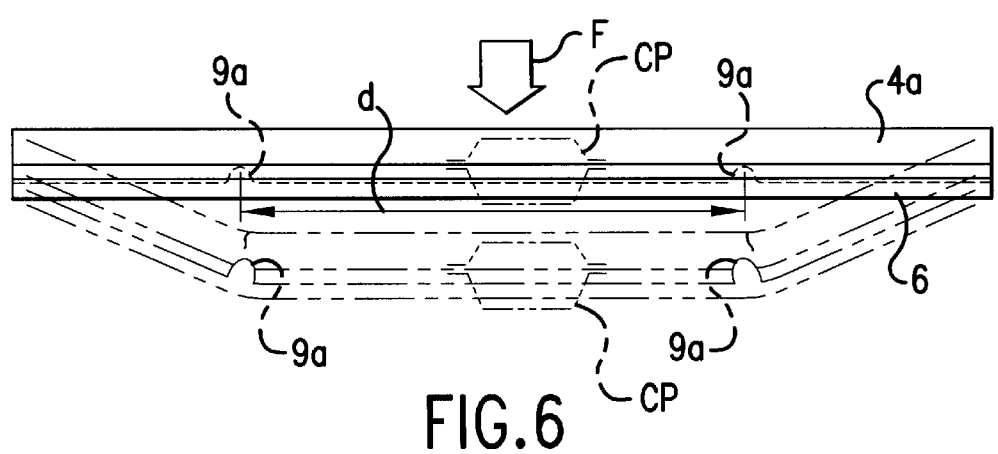
FIG. 6 is a view showing a modification of a reinforcing frame in the side sill in FIG. 1.

In this case, in the side sill SSa shown in FIGS. 5 and 6, the rigidity of the reinforcing frame 4 forming the second closed space e2 as well as the rigidity of the side sill outer 204 and the side sill inner 304 forming the first closed space e1 disperses the excessive compressive load through the side sill SS, i.e. disperses and transmits the excessive compressive load to the rear pillar disposed at the rear of the vehicle body. On this occasion, the reinforcing member 6 covers the two concave portions 9a in such a manner as to bridge the gap between them, and this prevents the covered portion from buckling quickly and maintains the rigidity of the covered portion against the buckling deformation at substantially the same level as the rigidity of other portions.

On the other hand, supposing that an overload F in the lateral direction Y is applied to the intermediate section of the side sill SSa when the vehicle receives a side impact at the intermediate section of the side sill SSa, the side sill outer 204 collapses first and the overload is then applied to the reinforcing frame 4a (see FIGS. 5 and 6). On this occasion, the pipe member 5a deforms at the two concave portions 9a toward the center of the vehicle body (the left side in FIG. 5) by the gap t1, so that the point p of the protruding portion 602a is faced on the side sill inner 304.

The side sill SSa in the vehicle body side frame structure 1a (not shown) shown in FIG. 5 achieves the same effects as the vehicle body side frame structure 1 shown in FIG. 1. Particularly because the protruding portion 602a of the reinforcing member 6a faces the vehicle compartment (inward), the facing of the protruding portion 602a on the side sill inner 304 improves the capacity to withstand the load. Moreover, after the facing of the protruding portion 602a on the side sill inner 304, the deformation speed and the deformation amount are significantly decreased, i.e. the bending mode control function can be. exercised to thus ensure the safety of passengers. Further, if a large overload F is applied in a side impact, the protruding portion 602a of the reinforcing member 6a and the pipe member 5a can sequentially absorb the overload F, and this significantly improves the impact absorbing function.

In the above description, the vehicle side sill structure of the present invention is applied to the vehicle body side frame structure 1, but the same effects can be achieved as the vehicle body side frame structure 1 shown in FIG. 1 if the side sill structure of the present invention is applied to a vehicle having another side sill.

As stated above, the structure of the present embodiment improves the rigidity to satisfactorily inhibit the buckling deformation of the fragile portions when the first closed section receives a compressive load in the frontal impact or the offset impact. Further, in the side impact, the respective fragile portions of the pipe member and the reinforcing member covering them can reduce the deformation amount and exercise the bending mode control function of controlling the mode of bending from the fragile portions. Moreover, the structure of the present embodiment is simplified, and this reduces the number of parts and the steps in welding and simplify dies and equipment, thus lowering the manufacturing cost.

According to the first embodiment, the second closed section is formed as the substantially convex portion that protrudes toward the outside of the vehicle, and this enables the point of the substantially convex portion to quickly deform in response to the overload to absorb energy. This preferably improves the impact absorbing function.

If the second closed section is formed as the substantially convex portion that protrudes toward the inside of the vehicle as in the second embodiment, the point of the substantially convex portion is faced on the inner wall of the side sill portion at the inside of the vehicle body when the side sill portion deforms due to the side impact. This preferably improves the impact absorbing function.

It should be understood, however, that there is no intention to limit the invention to the specific forms disclosed, but on the contrary, the invention is to cover all modifications, alternate constructions, and equivalents falling within the spirit and scope of the invention as expressed in the appended claims.

What is claimed is:

1. A vehicle side sill structure in which a side sill portion having a substantially closed section extending in a longitudinal direction of a vehicle body is provided at a side of the vehicle body, comprising:

a center pillar joined to an intermediate section of the side sill portion and extended upward;

a pipe member disposed inside said side sill portion and extended in the longitudinal direction of the vehicle body, at least two fragile portions being formed in a side portion of said pipe member across the intermediate section; and a reinforcing member disposed substantially along the side portion of said pipe member to cover the fragile portions, and cooperating with said side portion to form a second closed section.

2. A vehicle side sill structure according to claim 1, wherein the second closed section is substantially convex-shaped in such a manner as to protrude toward an outside of the vehicle body.

3. A vehicle side sill structure according to claim 1, wherein the second closed section is substantially convex-shaped in such a manner as to protrude toward an inside of the vehicle body.

4. A vehicle side sill structure according to claim 1, wherein the fragile portions are provided at substantially same distances from the intermediate section.

5. A vehicle side sill structure according to claim 1, wherein said pipe member includes bracket members for joining respective front and rear ends of the side sill portion to respective front and rear ends of said pipe member.

6. A vehicle side sill structure according to claim 1, wherein said reinforcing member includes extending plate portions provided at upper and lower ends thereof to extend in a vertical direction, and includes a plurality of bead portions provided in the longitudinal direction of the vehicle to extend in the vertical direction.

* * * * *